Patented Mar. 14, 1950

2,500,792

UNITED STATES PATENT OFFICE 2,500,792

PRODUCTION OF POTASSIUM FLUOZIRCONATES

Harold J. Blythe, Swinton, and Alfred L. Hock, Worsley, England, assignors to Magnesium Elektron Limited, London, England, a British company No Drawing. Application April 8, 1948, Serial No. 19,893. In Great Britain April 29, 1947

6 Claims. (Cl. 23—50)

This invention relates to the production of potassium fluozirconates, i. e. double salts of zirconium fluoride with potassium fluoride. The ratio of potassium fluoride to zirconium fluoride in these double salts is variable and the present invention is solely concerned with the production of potassium fluozirconates having any $KF:ZrF_4$ molecular ratio between 1 and 2.5.

The methods employed hitherto for the production of potassium fluozirconates involve one or more of the following disadvantages:

(a) The use of a substantially pure zirconium compound obtained from zirconium-containing minerals in a separate preliminary process, thus adding undesirable complication and cost to the preparation of the fluozirconate.

(b) When the method is based on the more direct treatment of zirconium-containing minerals by means of various reagents such as potassium fluoride and potassium bifluoride, excessive proportions of reagent are required and/or the yield is low and/or the product contains undesirable impurities.

(c) The methods are largely limited to the production of normal potassium fluozirconate ($K_2ZrF_6$) and do not readily yield potassium fluozirconates of $KF:ZrF_4$ molecular ratios between 1 and 2.5.

We have now found that potassium fluozirconates corresponding to any desired $KF:ZrF_4$ molecular ratio between 1 and 2.5 can be obtained by reacting together potassium chloride and aqueous hydrofluoric acid solutions of zirconium fluoride containing at least 1 mole of HF per 1 mole of $ZrF_4$, in proportions ranging from 1 to 3 moles of KCl to 1 mole of $ZrF_4$. It is a further feature of the present invention that we prefer to add the potassium chloride gradually to the hydrofluoric acid solution of zirconium fluoride and not vice versa and this order of addition is particularly desirable for the production of potassium fluozirconates having $KF:ZrF_4$ molecular ratios between 1 and 2.

The hydrofluoric acid solution of zirconium fluoride may conveniently be obtained by simply dissolving in hydrofluoric acid a zirconium ore consisting essentially of zirconia (e. g. baddeleyite) substantially soluble in such acid the proportion of acid being regulated to produce a solution of the required $HF.ZrF_4$ molecular ratio and separating any undissolved residue from the crude solution by known means. The potassium chloride may be used in finely-divided solid form but it is preferably used in the form of an aqueous solution, for example, a cold saturated solution.

The reaction involved in the preparation of potassium fluozirconates in accordance with the present invention may be represented by the simplified general equation:

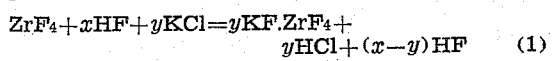

It will be apparent from this equation that in order to obtain the maximum yield of the desired potassium fluozirconate, not only is the proportion of potassium chloride which must be available in the reaction mixture determined by the $KF:ZrF_4$ molecular ratio of the double salt which is precipitated, but the amount of hydrogen fluoride present must also be at least molecularly equivalent to the quantity of potassium chloride introduced.

In the limited form of the present invention covering the preparation of potassium fluozirconates corresponding to $KF:ZrF_4$ molecular ratios between 1 and 2, the reactions which may take place may be broadly illustrated by the following equations which refer to potassium pentafluozirconate and normal potassium fluozirconate:

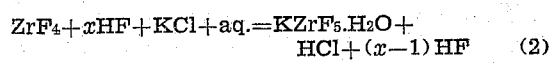
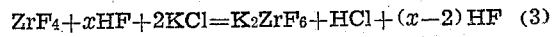

In line with the possible simultaneous occurrence of Reactions 2 and 3, the precipitation of potassium fluozirconates having $KF:ZrF_4$ molecular ratios approaching 1 is favoured by keeping the concentration of potassium ions as low as possible relative to that of the unprecipitated zirconium-containing ions at all stages of the reaction, i. e. by slowly adding the potassium chloride, preferably as potassium chloride solution, to the thoroughly agitated hydrofluoric acid solution of zirconium fluoride.

We have found that, other conditions being equal, the lower the $HF:ZrF_4$ molecular ratio of the hydrofluoric acid solution of zirconium fluoride employed, the lower is the minimum $KF:ZrF_4$ molecular ratio of the potassium fluozirconate which may be obtained consistent with a satisfactory high yield of product. Accordingly, when preparing complex potassium fluozirconates of low $KF:ZrF_4$ molecular ratio, e. g. 1.0 to 1.4, we prefer to use hydrofluoric acid solutions of zirconium fluoride containing a low $HF:ZrF_4$ molecular ratio, e. g. lower than is represented by normal fluozirconic acid, $H_2ZrF_6$.

We have observed that potassium fluozirconates precipitated from hydrofluoric acid solutions of zirconium fluoride of very low $HF:ZrF_4$ molecular ratio, e. g. 1.5 and under, may tend to be less crystalline and more difficult to filter than those precipitated from solutions containing more hydrofluoric acid, but we find that this undesirable characteristic may be countered by addition of a small proportion of acid, e. g. hydrochloric acid.

We find furthermore that although increasing the total amount potassium chloride added relative to the amount of $ZrF_4$ present in the hydrofluoric acid solution increases the $KF:ZrF_4$ molecular ratio of the precipitated potassium fluozirconate, the latter increase is not proportional to the additional KCl input. Still greater yields of potassium fluozirconate of only slightly higher $KF:ZrF_4$ molecular ratio may thus be obtained.

We have also found that the formation of potassium fluozirconates of low $KF:ZrF_4$ molecular ratios is assisted by carrying out the interaction of the potassium chloride and the hydrofluoric acid solution of zirconium fluoride in the cold. The reaction is slightly exothermic and when a potassium fluozirconate of such low ratio is desired, we prefer to react together cold potassium chloride solution and cold hydrofluoric acid solution of zirconium fluoride. We may also cool the reaction mixture during and after the reaction. By separating the precipitated potassium fluozirconate from the mother liquor in the cold, the additional advantage of a greater yield is obtained because of the reduced solubility of the fluozirconate with decreasing temperature. With the same object in view, we may use potassium chloride solution of high concentration, e. g. a cold saturated solution, and/or a concentrated hydrofluoric acid solution of zirconium fluoride, because of the reduction in the final volume of the reaction mixture which the use of such concentrated solution allows.

In a preferred method of carrying out the invention in such a manner as to produce a potassium fluozirconate having a $KF:ZrF_4$ molecular ratio of about 1.2, a crude aqueous hydrofluoric acid solution of zirconium fluoride is first prepared by dissolving baddeleyite in a regulated amount of commercial hydrofluoric acid of known strength, and filtering off the undissolved residue. The $HF:ZrF_4$ molecular ratio of the hydrofluoric acid solution of zirconium fluoride is conditioned, amongst other things, by the relative proportions of the baddeleyite and hydrofluoric acid employed, but is suitably about 1.5. This crude solution which contains, for example, 30% $ZrF_4$ will also contain a substantial proportion of the iron, manganese and other impurities present in the original mineral. A cold saturated solution of commercial potassium chloride is then run gradually into the cold continuously agitated hydrofluoric acid solution of zirconium fluoride, the quantity of potassium chloride added being such as to correspond to a total input of up to 1.2 moles of KCl per mole of $ZrF_4$. When the whole of the potassium chloride solution has been added the potassium fluozirconate, which is precipitated in a crystalline readily filterable and washable condition, is then filtered off in the cold and washed with cold water to remove metallic impurities and chloride ions. The filtered product is then dried, e. g. in a vacuum dryer at 100° C. When the reaction is carried out by the above preferred method, a yield of 84% calculated on the total HF-soluble $ZrO_2$ content of the mineral and of 95% calculated on the KCl input may be obtained. Furthermore, the potassium fluozirconate obtained is of such a high degree of purity, that further purification, e. g. by re-crystallisation, is unnecessary for most of its technical applications. It may, for example, contain iron, aluminium, manganese and silicon compounds in quantities corresponding to less than 0.02% Fe, 0.05% Al, 0.01% Si and a trace of Mn respectively, when prepared from baddeleyite containing 2.55% Fe, 1.26% Al, 2.5% Si and 0.23% Mn. The following examples illustrate but do not determine the limits of our inventions:

*Example 1*

35 parts of ground baddeleyite, containing 78% extractable $ZrO_2$ are dissolved in 49 parts of aqueous commercial hydrofluoric acid (55%), 20 parts of hot water added and the insoluble residue filtered off. The residue is washed with 45 parts of hot water. The filtrate containing 28 parts $ZrF_4$ and 15.3 parts of HF in 135 parts of solution is cooled to 15° C. and 140 parts of cold aqueous saturated (15° C.) solution of potassium chloride is added over a period of 45 minutes, the whole being thoroughly agitated during the mixing. The potassium fluozirconate is filtered off and washed with cold water until free from chloride ions. It is finally dried at 250–300° C. in air or at a temperature approaching 100° in vacuo. The yield is 52 parts of potassium fluozirconate containing 28.5% K and 28.6% Zr. The molecular ratio $KF:ZrF_4$ is 2.34.

*Example 2*

41 parts of ground baddeleyite containing 78% extractable $ZrO_2$ are dissolved in 42 parts of aqueous commercial hydrofluoric acid (60%), 20 parts of hot water added, and the insoluble residue filtered off. The residue is washed with 50 parts of hot water. The filtrate containing 32.6 parts of $ZrF_4$ and 5.4 parts of HF in 132 parts of solution is then cooled to 15° C. and 60 parts of a cold saturated (15° C.) aqueous solution of potassium chloride run in over a period of 45 minutes, the mixture being thoroughly agitated the whole of the time. The precipitated potassium fluozirconate is filtered and washed with cold water until free from chloride ions. It is finally dried at 250–300° C. in air or at a temperature approaching 100° C. in vacuo. The yield is 45 parts of potassium fluozirconate containing 18.6% K and 37.2% Zr. The molecular ratio $KF:ZrF_4$ is 1.17.

We claim:

1. In a process for the production of potassium fluozirconates having $KF:ZrF_4$ molecular ratios between 1 and 2.5 the step which comprises reacting together potassium chloride and an aqueous hydrofluoric acid solution of zirconium fluoride containing at least 1 mole of HF per 1 mole of $ZrF_4$, in proportions ranging from 1 to 3 moles of KCl per 1 mole of $ZrF_4$.

2. In a process for the production of potassium fluozirconates having $KF:ZrF_4$ molecular ratios between 1 and 2.5, the step which comprises reacting together potassium chloride and an aqueous hydrofluoric acid solution of zirconium fluoride containing at least 1 mole of HF per 1 mole of $ZrF_4$, in proportions ranging from 1 to 3 moles of KCl per 1 mole of $ZrF_4$, the potassium chloride being added gradually as an aqueous solution to the hydrofluoric acid solution of zirconium fluoride.

3. In a process for the production of potassium fluozirconates having $KF:ZrF_4$ molecular ratios between 1 and 2.5, the step which comprises reacting together potassium chloride and an aqueous hydrofluoric acid solution of zirconium fluoride containing at least 1 mole of HF per 1 mole of $ZrF_4$, in proportions ranging from 1 to 3 moles of KCl per 1 mole of $ZrF_4$, acid being added to the hydrofluoric acid solution of zirconium fluoride before adding the potassium chloride.

4. In a process for the production of potassium fluozirconates having $KF:ZrF_4$ molecular ratios between 1 and 2.5, the steps which comprise preparing a hydrofluoric acid solution of zirconium fluoride by dissolving in hydrofluoric acid a zirconium ore substantially soluble in such acid, the proportion of acid being regulated to produce a hydrofluoric acid solution of zirconium fluoride containing at least 1 mole of HF per 1 mole of $ZrF_4$, separating the solution from undissolved solid residue, and adding potassium chloride to the solution in proportions ranging from 1 to 3 moles of KCl per 1 mole of $ZrF_4$.

5. A process for the production of potassium fluozirconates having $KF:ZrF_4$ molecular ratios between 1 and 2.5, which comprises reacting together potassium chloride and an aqueous hydrofluoric acid solution of zirconium fluoride containing at least 1 mole of HF per 1 mole of $ZrF_4$, in proportions ranging from 1 to 3 moles of KCl per 1 mole of $ZrF_4$, filtering the product, and washing the filtrate with water until free from chloride ions.

6. A process for the production of potassium fluozirconates having $KF:ZrF_4$ molecular ratios between 1 and 2.5, which comprises dissolving in hydrofluoric acid a zirconium ore substantially soluble in such acid, the proportion of acid being regulated to produce a hydrofluoric acid solution of zirconium fluoride containing at least 1 mole of HF per 1 mole of $ZrF_4$, separating the solution from undissolved solid residue, adding acid to the solution, gradually adding an aqueous solution of potassium chloride to the zirconium fluoride solution in proportions ranging from 1 to 3 moles of KCl per 1 mole of $ZrF_4$, filtering the fluozirconate so produced, and washing it with water until free from chloride ions.

HAROLD J. BLYTHE.
ALFRED L. HOCK.

REFERENCES CITED

The following references are of record in the file of this patent:

"A Comprehensive Treatise on Inorganic and Theoretical Chemistry," vol. 7, 1927 Ed., by J. W. Mellor, page 140. Longmans, Green & Co., N. Y., publishers.